US012570264B2

(12) United States Patent (10) Patent No.: US 12,570,264 B2
Tione (45) Date of Patent: Mar. 10, 2026

(54) MONITORING DEVICE OF THE OPEN OR CLOSED STATE OF AN ELECTRIC LINE OF A RAILWAY VEHICLE, AND ELECTRIC LINE OF A RAILWAY VEHICLE

(71) Applicant: FAIVELEY TRANSPORT ITALIA S.P.A., Piossasco (IT)

(72) Inventor: Roberto Tione, Lauriano (IT)

(73) Assignee: Faiveley Transport Italia S.P.A., Piossasco (IT)

( * ) Notice: Subject to any disclaimer, the term of this patent is extended or adjusted under 35 U.S.C. 154(b) by 782 days.

(21) Appl. No.: 17/760,282

(22) PCT Filed: Feb. 12, 2021

(86) PCT No.: PCT/IB2021/051179
§ 371 (c)(1),
(2) Date: Aug. 5, 2022

(87) PCT Pub. No.: WO2021/161241
PCT Pub. Date: Aug. 19, 2021

(65) Prior Publication Data
US 2023/0083980 A1 Mar. 16, 2023

(30) Foreign Application Priority Data
Feb. 13, 2020 (IT) ........................ 102020000002917

(51) Int. Cl.
*B60T 17/22* (2006.01)
*B60T 13/66* (2006.01)
*B61L 15/00* (2006.01)
(52) U.S. Cl.
CPC .......... *B60T 17/228* (2013.01); *B60T 13/665* (2013.01); *B61L 15/0081* (2013.01); *B60Y 2200/30* (2013.01)

(58) Field of Classification Search
CPC .. B60T 17/228; B60T 13/665; B61L 15/0081; B60Y 2200/30
See application file for complete search history.

(56) References Cited

U.S. PATENT DOCUMENTS 3,334,224 A * 8/1967 Allen ........................ B61L 3/00
246/187 B
4,869,557 A * 9/1989 Gerum .................. B60T 13/665
303/3
(Continued)

FOREIGN PATENT DOCUMENTS

CN 106274967 A * 1/2017
CN 111717186 B * 5/2024
(Continued)

OTHER PUBLICATIONS

ISA European Patent Office, International Search Report Issued in Application No. PCT/IB2021/051179, Jun. 22, 2021, WIPO, 2 pages.
(Continued)

*Primary Examiner* — Jason C Smith
(74) *Attorney, Agent, or Firm* — K&L Gates LLP

(57) ABSTRACT
A monitoring device of the open or closed state of an electric line is disclosed. The device includes a first connection terminal and a second terminal connected to the electric line, a current generator that provides a non-zero reference current when there is a voltage greater than a predetermined minimum voltage Vmin at its ends and provides a zero current when there is a voltage less than the predetermined minimum voltage Vmin at its ends, at least one opto-isolator means including a lighting device and a respective photosensitive semi-conductor element, and a current detection and power supply module that detects current flowing therein, supplies a supply current to the lighting device when the detected current is equal to or greater than the reference
(Continued)

current, and supplies a zero supply current to the lighting
device when the detected current is less than the reference
current.

20 Claims, 6 Drawing Sheets

(56) References Cited

U.S. PATENT DOCUMENTS

| | | | | |
|---|---|---|---|---|
| 5,741,048 A | * | 4/1998 | Eccleston | B60T 17/22 |
| | | | | 303/7 |
| 6,039,409 A | * | 3/2000 | Engle | B60T 17/043 |
| | | | | 303/7 |
| 11,981,301 B2 | * | 5/2024 | Tione | B60T 8/92 |
| 2022/0258709 A1 | * | 8/2022 | Tione | B60T 8/1881 |
| 2023/0083980 A1 | * | 3/2023 | Tione | B60T 17/228 |
| | | | | 701/19 |

FOREIGN PATENT DOCUMENTS

| | | | | | |
|---|---|---|---|---|---|
| EP | 0829415 A1 | * | 3/1998 | | |
| EP | 3880527 B1 | * | 1/2023 | | |
| EP | 4003797 B1 | * | 9/2023 | | B60T 8/1705 |
| GB | 720449 A | * | 12/1954 | | |
| IT | 102020000002917 B1 | * | 2/2022 | | |
| JP | 5165900 A | | 6/1976 | | |
| JP | S52147309 A | | 12/1977 | | |
| JP | S52147819 A | | 12/1977 | | |
| JP | S62244752 A | | 10/1987 | | |
| JP | 2014006785 A | | 1/2014 | | |
| KR | 20120032719 A | * | 4/2012 | | |
| KR | 102647666 B1 | * | 3/2024 | | B60T 13/665 |
| WO | WO-2021014374 A1 | * | 1/2021 | | B60T 8/94 |
| WO | 2021161241 A1 | | 8/2021 | | |

OTHER PUBLICATIONS

International Search Report for corresponding PCT/IB2021/051179
dated Jun. 22, 2021.

* cited by examiner

MONITORING DEVICE OF THE OPEN OR CLOSED STATE OF AN ELECTRIC LINE OF A RAILWAY VEHICLE, AND ELECTRIC LINE OF A RAILWAY VEHICLE

CROSS REFERENCE TO RELATED APPLICATIONS

The present application is a U.S. National Phase of International Application No. PCT/IB2021/051179 entitled "MONITORING DEVICE OF THE OPEN OR CLOSED STATE OF AN ELECTRIC LINE OF A RAILWAY VEHICLE, AND ELECTRIC LINE OF A RAILWAY VEHICLE," and filed on Feb. 12, 2021. International Application No. PCT/IB2021/051179 claims priority to Italian Patent Application No. 102020000002917 filed on Feb. 13, 2020. The entire contents of each of the above-listed applications are hereby incorporated by reference for all purposes.

TECHNICAL FIELD

This invention is generally placed in the field of railway braking systems; in particular, the invention refers to a monitoring device of the open or closed state of an electric line of a railway vehicle and to an electric line of a railway vehicle.

PRIOR ART

It has been state of the art to monitor the state of the pressures upstream of brake cylinders of railway vehicles.

Knowing the pressure upstream of the brake cylinders is useful for various functions on board the railway vehicle.

In particular, one function is verifying that one or more brake cylinders are not supplied with an undue braking pressure when the traction system is activated to accelerate the train. If, in this particular case, an undue braking pressure is applied to one or more brake cylinders, the following events could occur:

the undue braking pressure is not sufficient to lock the axle associated with said brake cylinder, in which case the train would proceed in normal service with a brake applied and the braking pair, consisting of the disc/pads or wheel/shoes, would overheat to the point of leading to irreparable deterioration of said pair, even up to the risk of starting a fire that could spread to the non-resistant parts in the vicinity;

the undue braking pressure is sufficient to lock the axle associated with the brake cylinder, in which case if the axle belongs to a load-bearing bogie, it is dragged in a locked condition with subsequent irreparable flattening of the wheels at the sliding point between said wheels and the rails.

For this purpose, it is customary to use pressure switch devices. The pressure switch is a device having a pneumatic input to which a variable pressure is applied. Said pressure, through mechanisms inside the pressure switch, moves one or more electrical contacts as its instantaneous value varies. When the pressure is lower than a specific preset value for said pressure switch, the one or more electrical contacts assume a first state. When the pressure is higher than the specific preset value for the pressure switch, one or more electrical contacts assume a second state. In the first state the electrical contacts may be open and in the second state the electrical contacts may be closed, or vice versa, depending on the configuration of the pressure switch.

FIG. 1 illustrates a possible typical application for monitoring a plurality of brake cylinders on the same railway vehicle or train.

A plurality of brake cylinders 101, 102, . . . , 103 is used respectively for the braking axles 104, 105, . . . , 106 belonging to the railway vehicle or train.

Pneumatic supply lines 107, 108, . . . , 109, normally but not exclusively independent of each other, supply the brake cylinders 101, 102, . . . , 103, respectively, with a pneumatic braking pressure produced by one or more braking control systems present upstream of said pneumatic supply lines 107, 108, . . . , 109. The one or more braking control systems are not shown in FIG. 1.

Pressure switches 110, 111, . . . , 112 are pneumatically connected to pneumatic supply lines 107, 108, . . . , 109, respectively. The pressure switches 110, 111, . . . , 112 have at least one electrical contact characterized by assuming the closed state when the pressure at their pneumatic inlet is lower than a preset pressure value, and by assuming the open state when the pressure at their pneumatic inlet is higher than a preset pressure value.

Said preset pressure value is normally preset at a low enough value so as not to be able to apply a braking force to the associated axle. Said pressure value is normally between 0.2 bar and 0.4 bar.

An electric line 113 connects in series the electrical contacts of the pressure switches 110, 111, . . . , 112 and a coil 114 of a relay 115.

The two ends of said electric line 113 are respectively connected to a positive terminal 117 of a battery of the railway vehicle or train, and to the negative terminal 118 of this battery.

The relay 115 comprises contacts 116 which are in turn used to activate on-board brake status signaling systems of the railway vehicle or train, or to be put in series with contacts of other equivalent relays belonging to further railway vehicles or trains, when said further railway vehicles or trains are coupled to the railway vehicle or train, to create a series at a higher hierarchical level.

When all the pressures present in the pneumatic supply lines 107, 108, . . . , 109 are lower than said preset pressure value, all the electrical contacts belonging to the pressure switches 110, 111, . . . , 112 assume the closed contact state, giving electrical continuity to the electric line 113.

In this way, the coil 114 is powered at the battery voltage 117, bringing the one or more electrical contacts 116 of the relay 115 into a condition which indicates that all the brakes are released, and therefore the traction system may accelerate the vehicle or train without incurring the risks mentioned above.

When at least one of the pneumatic supply lines 107, 108, . . . , 109 is fed by a pressure higher than said preset pressure value, the electrical contact of the pressure switch associated with said at least one pneumatic supply line opens, interrupting the electric line 113, de-energizing the coil 114 of the relay 115. In this way, the one or more contacts 116 of the relay 115 assume a condition indicating that at least one brake cylinder is applying a braking force to the respective axle, incurring one of the risks mentioned above.

The following technological problems inherent to pressure switch devices are known:

inaccuracy of the calibration of the preset pressure value;

variation of the calibration of the preset pressure value with aging;

oxidation of contacts; and limited maximum guaranteed number of opening and closing operations of the electrical contacts, no longer sufficient with respect to the requests from railway operators to increase the duration of the maintenance cycles in which the pressure switches are checked and possibly replaced.

In order to remedy the technological problems inherent in pressure switch devices, it is a market trend to replace said pressure switch devices with functionally equivalent devices made exclusively with semiconductor circuits.

This patent refers to the following European railway standards:

EN-50115 "Railway applications—Electronic equipment used on rolling stock";

EN-50159 "Railway applications—Communication, signalling and processing systems—Safety related electronic systems for signalling."

FIG. 2 is a possible functional diagram of a circuit equivalent to a pressure switch device. The equivalent circuit is defined here and hereinafter as an electronic pressure switch.

A pressure transducer 201 converts a pressure value 202 into an electrical signal 203. An amplifier 204 amplifies the electrical signal 203, transforming it into an amplified electrical signal 205.

The voltage comparator 207 compares the amplified electrical signal 205 with a reference voltage value 206, corresponding to the predetermined pressure value at which the functional output of the equivalent circuit of the pressure switch device must switch.

When the amplified electrical signal 205 is lower than the reference voltage 206, the output 208 of the comparator 207 assumes a first state; when the amplified electrical signal 205 is higher than the reference voltage 206, the output 208 of the comparator 207 assumes a second state.

The EN-50155 standard recommends the use of galvanic isolation to separate the outputs of electronic circuits from the control part of said electronic circuits. To satisfy this recommendation a signal 208 drives an LED diode 209 of an opto-isolator 210.

In a first configuration of the equivalent circuit, the first state assumed by the electrical signal 208 may be such as to make the switching device 211 of the opto-isolator 210 assume a closed-circuit state, and the second state assumed by the electrical signal 208 may be such as to cause the switching device 211 of the opto-isolator 210 to assume an open-circuit state. In a second configuration of the equivalent circuit, the first state assumed by the electrical signal 208 may be such as to make the switching device 211 of the opto-isolator 210 assume an open-circuit state, and the second state assumed by the electrical signal 208 may be such as to cause the switching device 211 of the opto-isolator 210 to assume a closed-circuit state.

The EN-50155 standard recommends that the electronic output circuits of devices for railway use be equipped with protections against overcurrents and possibly have a permanent diagnostic function that allows monitoring of the output status.

An electronic protection circuit 212, the circuit nature of which may take different forms known to those skilled in the art of electronic engineering, placed in series with the switching device 211, interrupts the series circuit in the presence of a predetermined current value for which said protection circuit 212 is designed.

The protection circuit 212 may further drive an LED device 213 of an opto-isolator 214 to transmit diagnostic information on the state of the output circuit by energizing or de-energizing a switching device 215 of the opto-isolator 214, said switching device 215 being connected to a subsequent possible circuit adapted to turn off the comparator 207 in the event of a prolonged overcurrent and to possibly generate a further diagnostic information signal 218 for other users not illustrated in FIG. 2.

The relative simplicity of this circuit, and the reduced number of electronic components that make it up, bring the following advantages:

the MTBF (Mean Time Between Failures) parameter of said circuit is significantly higher than that of a traditional pressure switch device;

the stability over time of the values of the electronic components is much higher than the stability of the mechanical components of the traditional pressure switch device.

On the other hand, this circuit has the drawback of having a voltage drop at its ends 219, 220 which may reach 5 volts, especially in the vicinity of the maximum allowed current, and in the presence of a second protection circuit 221 as recommended by standard EN50129, in the case of high SIL safety levels.

In the electrical circuit of FIG. 1, the voltage drop represented by the series of electrical contacts of the pressure switches 110, 111, . . . , 112 is on the order of tens of millivolts. If the pressure switches 110 were each replaced by the circuit shown in FIG. 2, the drop would be evaluated in several volts.

Considering that a medium-length train may consist, for example, of four cars, or eight bogies, or 16 axles, the total drop made up of a series of equivalent solid-state pressure switches as shown in FIG. 2 may reach a few tens of volts. This fact, added to the permitted variations of the battery voltage 117, in the range −30% to +25% with respect to the nominal value of said battery voltage, makes it impossible to find a relay 115, the coil 114 of which is able to operate in joint presence of such voltage drops and variations.

SUMMARY OF INVENTION

An object of this invention is therefore to provide a monitoring device of the open or closed state of an electric line of a railway vehicle and an electric line for a railway vehicle which allow the advantages of the functional diagram of a circuit equivalent to an electronic pressure switch device described above to be maintained, i.e., the advantages regarding the "mean time between failures" and the stability over time of the values of the electronic components, and at the same time having a low impact of voltage drop.

The aforesaid and other objects and advantages are achieved, according to an aspect of the invention, by a monitoring device of the open or closed state of an electric line of a railway vehicle and an electric line for a railway vehicle having the features defined in the respective independent claims. Preferred embodiments of the invention are defined in the dependent claims, the content of which is to be understood as an integral part of this description.

BRIEF DESCRIPTION OF THE DRAWINGS

The functional and structural characteristics of some preferred embodiments of a monitoring device of the open or closed state of an electric line of a railway vehicle and of an electric line for a railway vehicle according to the invention will now be described. Reference is made to the appended drawings, wherein.

DETAILED DESCRIPTION

Figure 1:
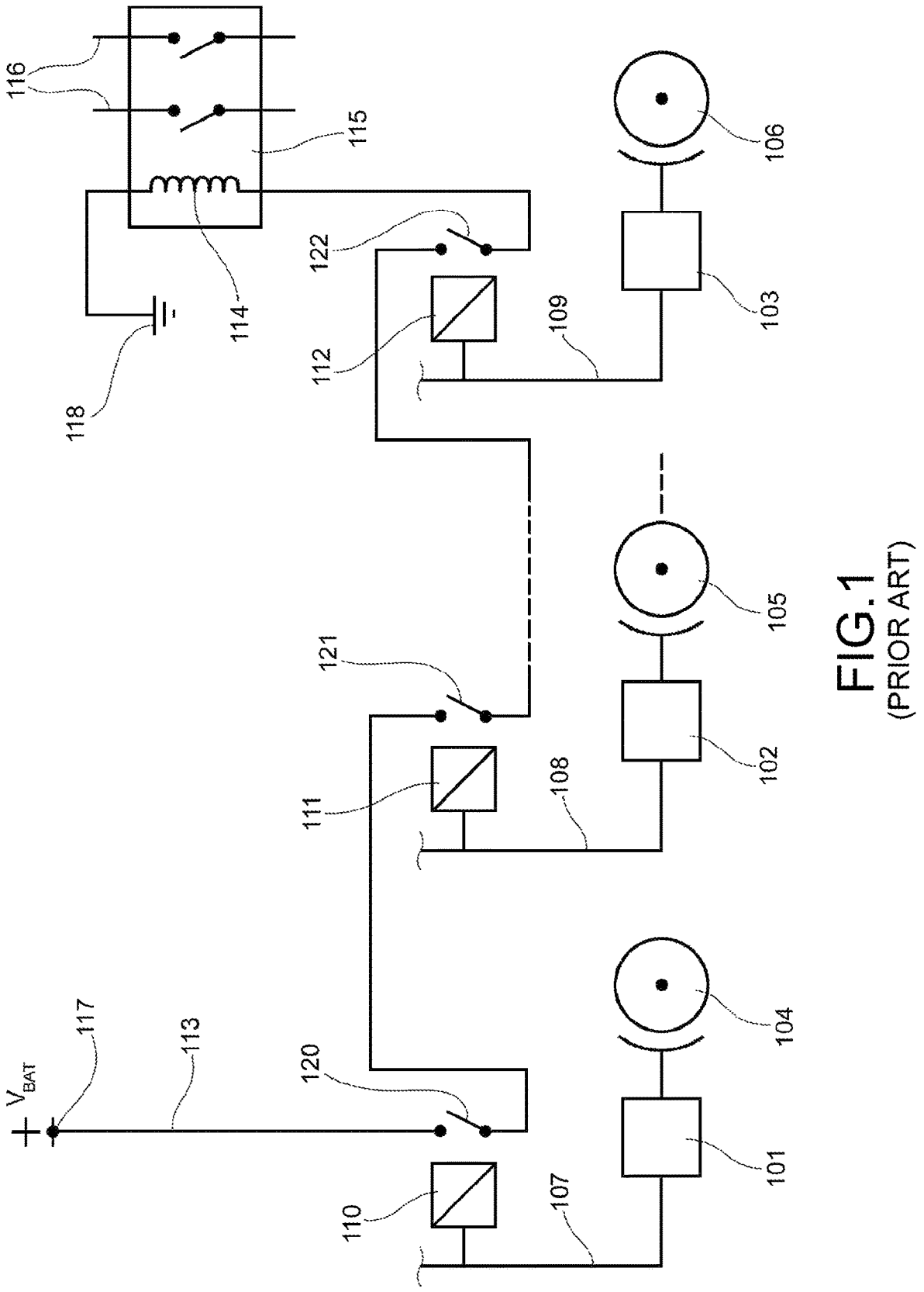
FIG. 1 illustrates a possible typical application for monitoring a plurality of brake cylinders on the same railway vehicle or train.

Before describing a plurality of embodiments of the invention in detail, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

This invention relates to a monitoring device 308 of the open or closed state of an electric line of a railway vehicle. As may be seen for example in FIG. 4, the electric line is connected on a first side to a terminal 317 of a battery of the railway vehicle and on a second side to a reference potential. The reference potential may be, for example, a ground.

The electric line includes at least one electric line disconnecting means (120, 121, 122, 501, 502, 503) arranged to open or close the electric line.

The monitoring device 308 of the open or closed state of an electric line of a railway vehicle includes a first connection terminal T1 arranged to be connected to a first point of said electric line and a second terminal T2 arranged to be connected to a second point of said electric line.

The monitoring device 308 of the open or closed state of an electric line of a railway vehicle further includes a current generator 301. The current generator 301 is arranged to supply in said electric line a reference current Igen having a predetermined non-zero value when there is a voltage greater than a predetermined minimum voltage Vmin at the ends of said current generator 301 and to supply a zero current in said electric line when there is a voltage lower than the minimum predetermined voltage Vmin at the ends of said current generator 301.

The monitoring device 308 of the open or closed state of an electric line of a railway vehicle further includes at least one opto-isolator means 306, 605, 613 including a lighting device 305, 603, 612 and a respective photosensitive semiconductor element 307, 604, 611.

Still further, the monitoring device 308 of the open or closed state of an electric line of a railway vehicle includes a current detection and power supply module 304. The current detection and power supply module 304 is arranged to detect the current flowing in said current detection and power supply module 304. Furthermore, the current detection and power supply module 304 is arranged to provide a supply current to said lighting device 305, 603, 612 arranged to turn on the at least one lighting device 305, 603, 612, when the detected current has a value equal to or greater than the value of the reference current Igen generated by said current generator 301. In addition, the current detection and power supply module 304 is arranged to provide a substantially zero supply current to said lighting device 305, 603, 612 so as to turn off the at least one lighting device 305, 603, 612 when the detected current has a value lower than the value of the reference current Igen generated by said current generator 301.

"Substantially zero supply current" means a zero current or a current low enough not to turn on the lighting device 305, 603, 612.

The at least one photosensitive semiconductor element 307, 604, 611 assumes, at its output terminals 309, a first state, when the lighting device 305, 603, 612 is off and does not illuminate the at least one photosensitive semiconductor element 307, 604, 611. Furthermore, the at least one photosensitive semiconductor element 307, 604, 611 assumes, at its output terminals 309, a second state, when the lighting device 305, 603, 612 is on and illuminates the at least one photosensitive semiconductor element 307, 604, 611.

The first state of said photosensitive semiconductor element is indicative of the fact that the electric line of the railway vehicle is in an open state. In other words, the first state of said photosensitive semiconductor element is indicative of the fact that at least one electric line disconnecting means 120, 121, 122, 501, 502, 503 has opened the electric line.

Figure 3:
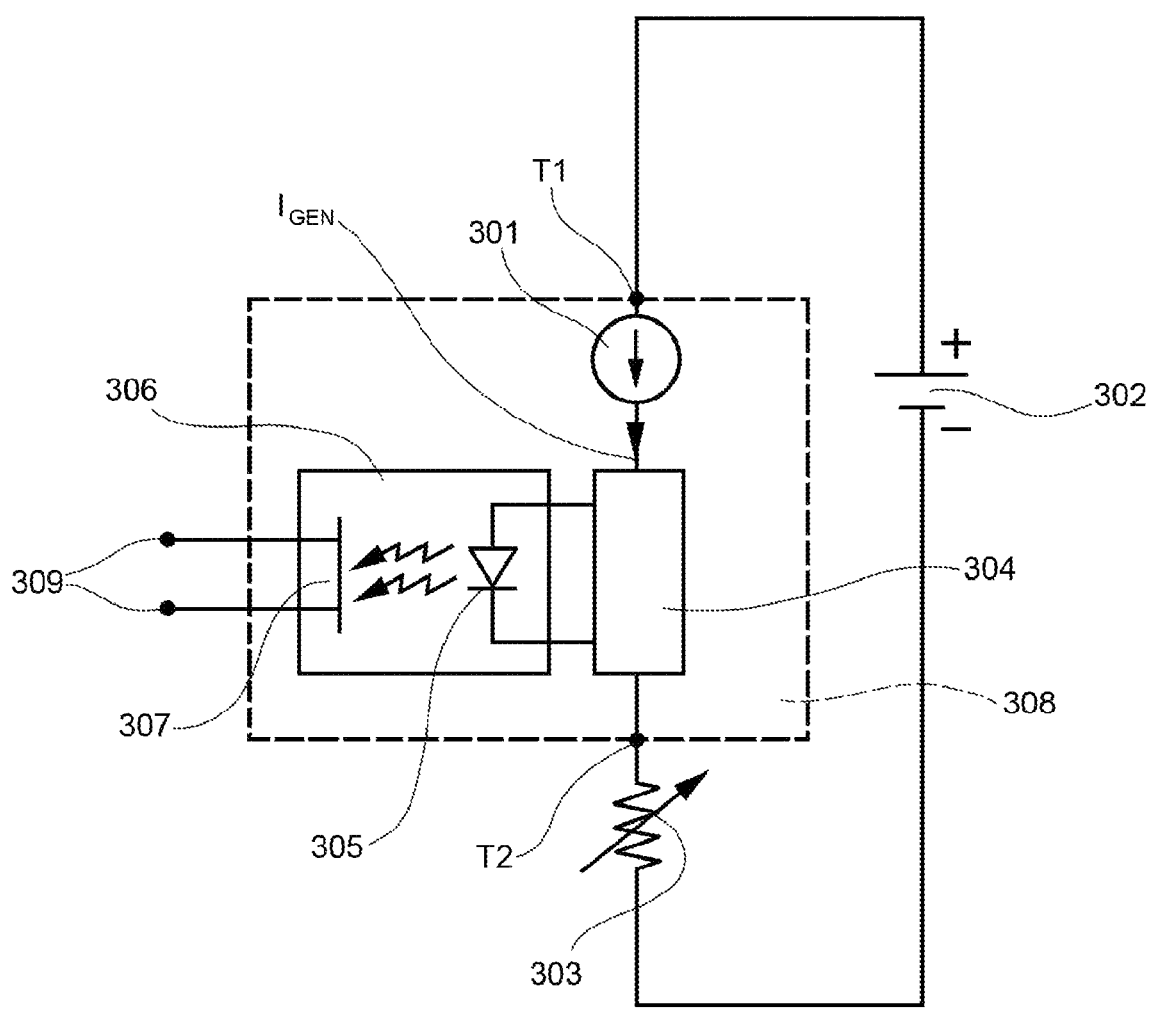
FIG. 3 illustrates a single-loop circuit.

Observing FIG. 3, an example of operation of the monitoring device 308 of the open or closed state of an electric line of a railway vehicle through the use of a voltage generator and a resistor with variable resistance is explained in detail. A single-loop circuit comprises:

a voltage generator 302, generating a voltage value Vbat;

a variable resistor 303, having an instantaneous resistive value R303; and a monitoring device 308 of the open or closed state of an electric line of a railway vehicle according to this invention.

For example, the current generator 301 is a real current generator, not an ideal one. It is known from electrical engineering that an ideal current generator generates a preset current value regardless of the voltage value present at its ends, including the zero-voltage value and the infinite voltage value.

The current generator 301 is defined as real because it generates a current Igen when a voltage value greater than or equal to a minimum voltage value Vmin is present at its ends and generates a zero current when a voltage value is present at its ends that is less than a minimum voltage value Vmin. The voltage value Vmin is less than the value Vbat generated by the voltage generator 302.

The current detection and power supply module 304, placed in series with the current generator 301, supplies the lighting device 305 of the opto-isolator means 306, for example an LED, when a current higher than a predetermined value Imin flows therein, and does not supply the lighting device 305 when a current lower than a predetermined value Imin flows therein, including a zero-current value.

The current detection and power supply module 304 uses, in part or in whole, the reference current Igen generated by the current generator 301 to power the lighting device 305. For purely explanatory purposes, the voltage drop at the ends of the detection and power supply module 304 is assumed to be zero in the presence of a reference current Igen.

The opto-isolator 306 contains a photosensitive semiconductor element 307, which may assume an open-circuit state or a closed-circuit state depending on whether the lighting device 305 is emitting light radiation or not. Opto-isolators 306 are available on the market, the photosensitive semiconductor of which assumes a closed-circuit state in the presence of light radiation and an open circuit in the absence of light radiation. There are also opto-isolators 306 on the market, the photosensitive semiconductor of which assumes a closed-circuit state in the absence of light radiation and an open circuit in the presence of light radiation.

By resetting the resistive value R303 of the variable resistor 303, all the voltage Vbat>Vmin supplied by the voltage generator 302 will be present at the ends of the current generator 301. In this case, the current generator 301 generates the reference current value Igen, which is detected by the current detection and power supply module 304, which in turn powers the lighting device 305, i.e., the LED.

By gradually increasing the resistive value R303 of the variable resistor 303, the current generator 301 continues to generate the reference current Igen, as long as the resistance value R303 does not reach a value whereby $$Vbat-Igen*R303=Vmin$$

By further increasing the resistive value R303, the condition is reached whereby $$Vbat-Igen*R303>Vmin$$

That is, the condition is reached whereby the current generator 301 ceases to generate the reference current Igen. In this situation, the current detection and power supply module 304 ceases to supply the lighting device 305, i.e., the LED.

Figure 4:
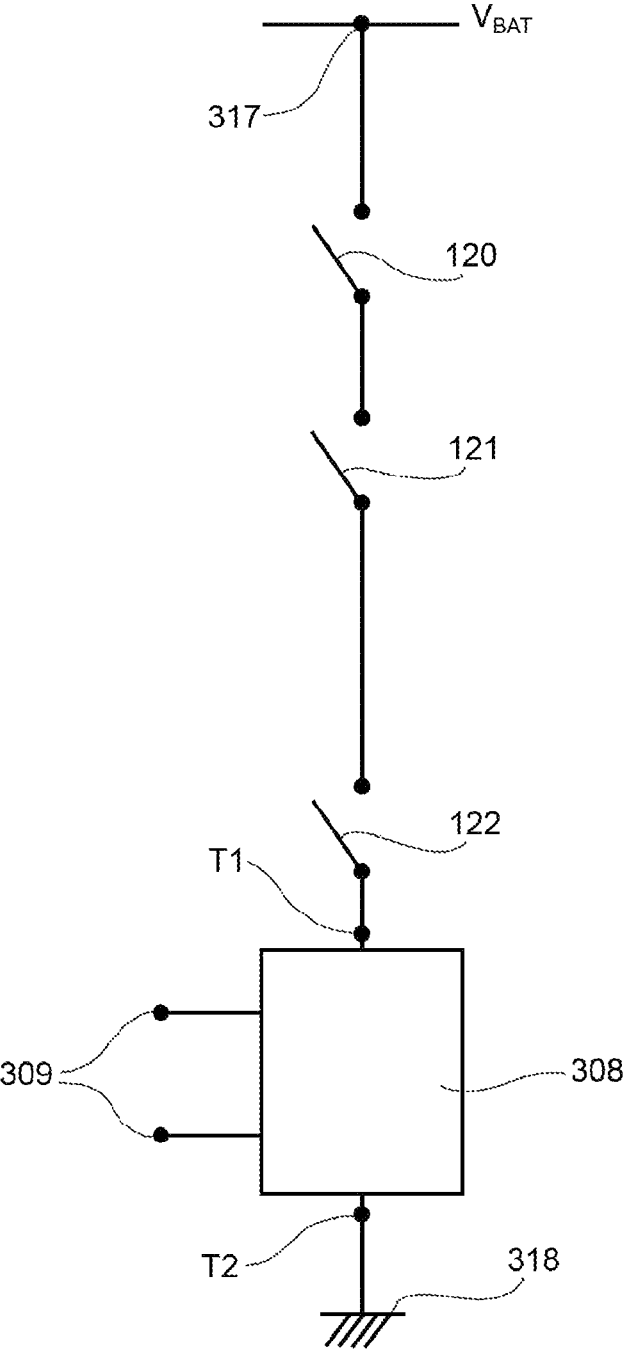
FIG. 4 illustrates a first embodiment of an electric line for a railway vehicle according to this invention.

FIG. 4 shows the wiring diagram described in FIG. 1, where the relay 115 is replaced by a monitoring device 308 of the open or closed state of an electric line of a railway vehicle according to the invention, which comprises the current generator 301, the current detection and power supply module 304 and the opto-isolator 306. The condition wherein all the electric line disconnecting means 120, 121, 122 are closed corresponds to the R303=0 condition described previously. In this case, in the current generator 301, inside the monitoring device 308 of the open or closed state of an electric line of a railway vehicle, the reference current Igen is generated, which is detected by the detection and power supply module 304, which in turn powers the lighting device 305. The condition wherein at least one of the electric line disconnecting means 121, 122, . . . 123 is open corresponds to the R303=∞ condition whereby the voltage at the ends of the current generator 301 is zero or less than Vmin, whereby the current generator 301 generates a zero current. In this case the current detection and voltage supply module 304 does not detect the reference current value Igen and therefore does not turn on the lighting device 305.

Depending on the on or off state assumed by the lighting device 305, the output terminals 309 of the photosensitive semiconductor 307, i.e., the output terminals 309 of the monitoring device 308 of the open or closed state of an electric line of a railway vehicle, will assume a subsequent state indicating that all brake cylinders have zero pressure, or that at least one brake cylinder has braking pressure applied.

FIG. 4 shows that the device 308 for monitoring the open or closed state of an electric line of a railway vehicle may be advantageously used in place of the relay 115, increasing the reliability and availability by at least an order of magnitude, due to the absence of moving mechanical contacts that are subject to oxidation inside the monitoring device 308 of the open or closed state of an electric line of a railway vehicle.

Figure 5:
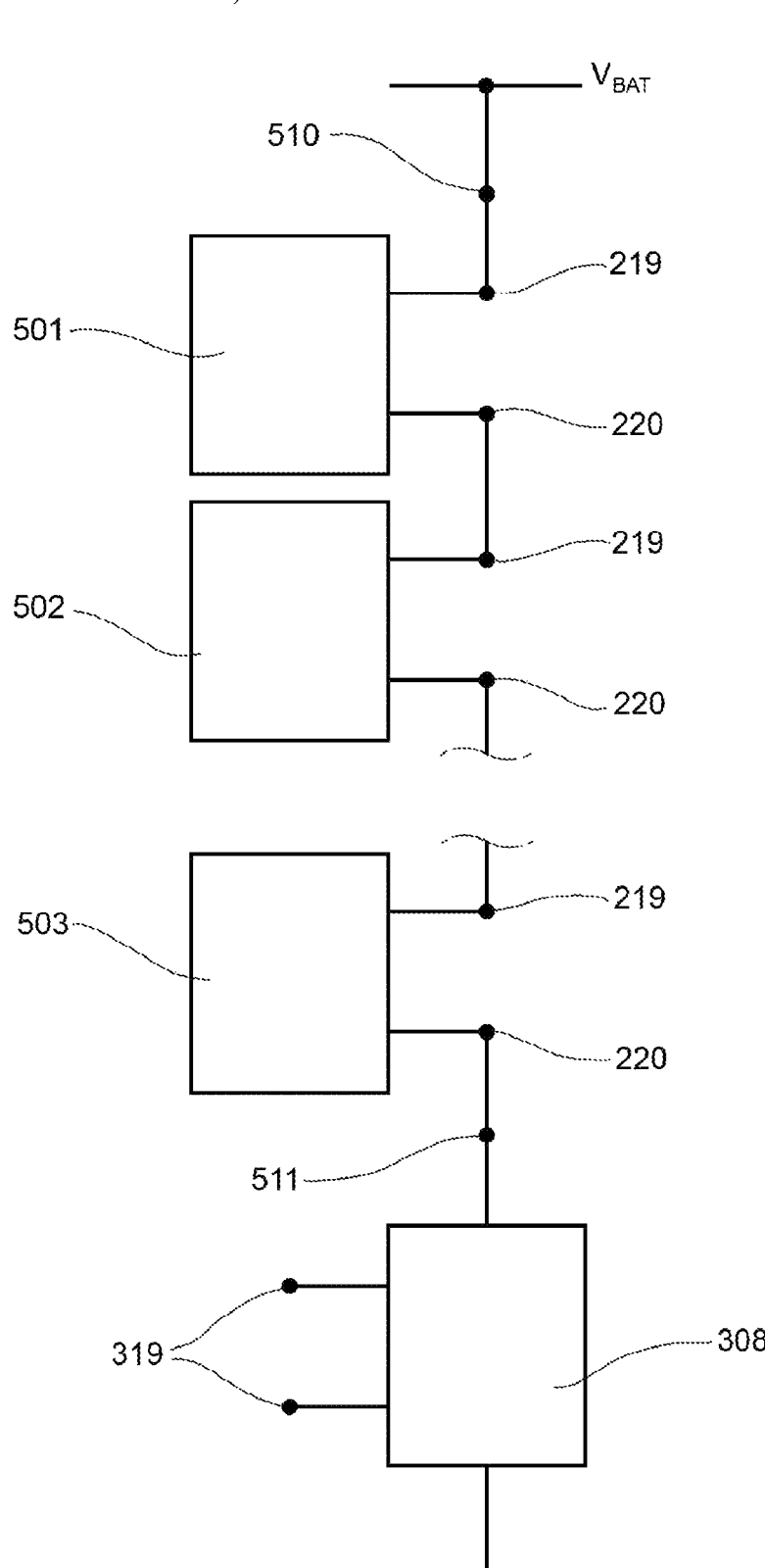
FIG. 5 is a diagram equivalent to that described in FIG. 1, wherein a relay is replaced by a monitoring device of the open or closed state of an electric line of a railway vehicle according to this invention.

FIG. 5 shows the wiring diagram described in FIG. 1, where the relay 115 is replaced by the monitoring device 308 of the open or closed state of an electric line of a railway vehicle and the electromechanical pressure switches 110, 111, . . . 112 are replaced by electric line disconnecting means in the form of electronic pressure switches 501, 502, . . . 503. The electronic pressure switches 501, 502, . . . 503 are each made for example but not exclusively according to the diagram illustrated in FIG. 2.

Figure 2:
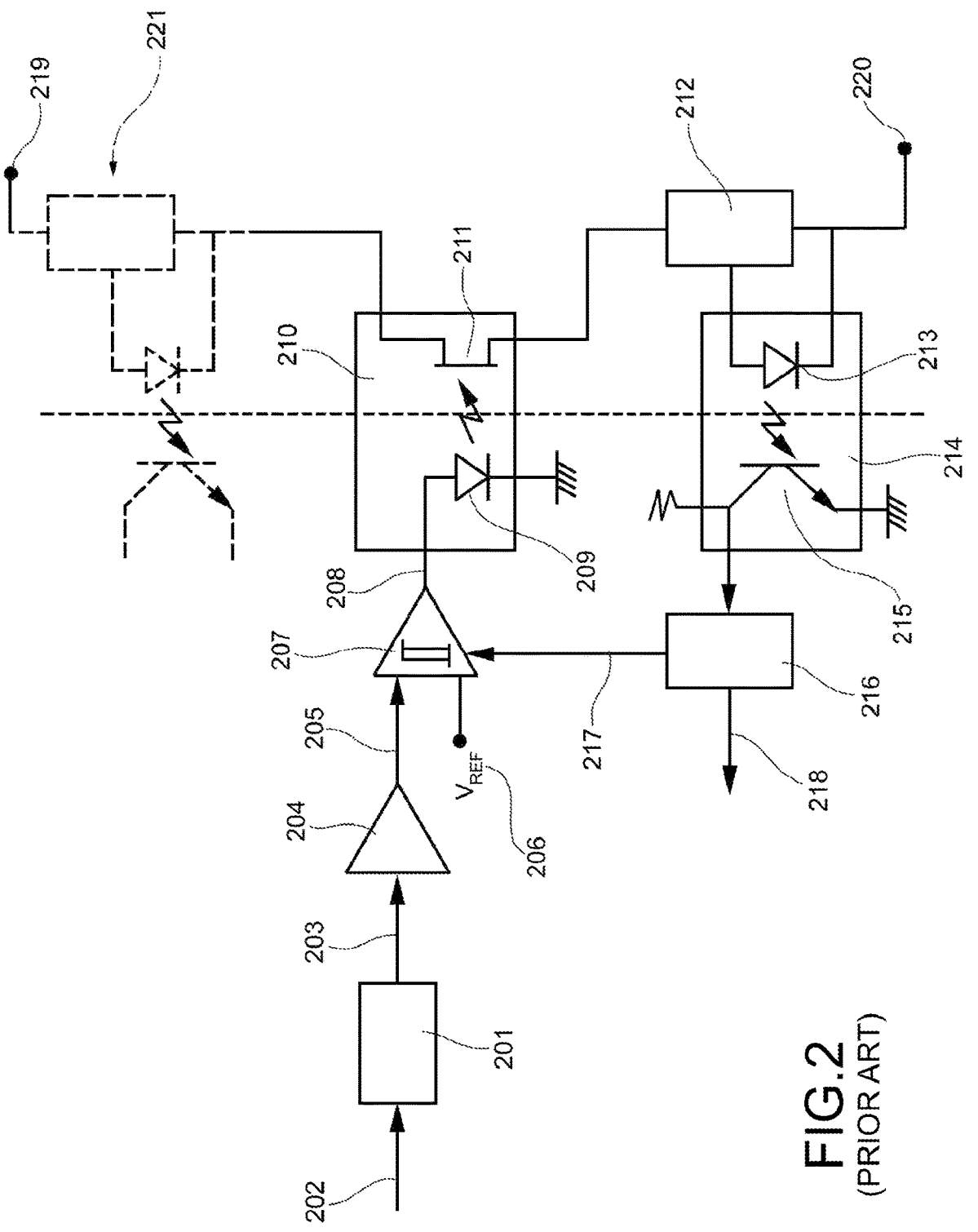
FIG. 2 is a possible functional diagram of a circuit equivalent to an electronic pressure switch device.

As previously described, if an electronic circuit equivalent to the one illustrated in FIG. 2 assumes at its terminals 219, 220 a configuration equivalent to the closed contact, when crossed by a current, there is a voltage drop Vc at said terminals 219, 220, which may reach values for example but not exclusively close to 5 V DC.

If all the n electronic pressure switches 501, 502, . . . 503 assume an equivalent closed contact condition, there is a voltage drop between the points 510 and 511 of the loop equal to n*Vt Volt.

In order for the current generator 301 inside the monitoring device 308 of the open or closed state of an electric line of a railway vehicle to continue to generate a reference current Igen in the presence of all the closed contacts, as illustrated in FIG. 4, the following equation must be respected:

$$Vbat-n*Vt>Vmin, \text{ that is, } n<(Vbat-Vmin)\backslash Vt \qquad (1)$$

Below is a non-exclusive example applied to a real case.

For example, the value of Vbat for a railway vehicle may assume the value of 110 V DC+25% to −30%, or in the worst case Vbat=77 V DC. Assuming that the device 308 needs a Vmin equal to 10 V DC in order to generate and detect a reference current Igen, and that each electronic pressure switch 501, 502, . . . 503 has at its terminals 219, 220 a maximum drop Vt=5 V DC, the equation (1) yields an n value:

$$n<(77-10)/5, \text{ that is, } n<13.4$$

In this case, up to 13 electronic pressure switches may be adopted in series.

The condition wherein at least one of the electronic pressure switches assumes an equivalent open contact condition at its terminals 219, 220 is equivalent to the same condition described for the diagram of FIG. 4.

FIG. 5 shows that the monitoring device 308 of the open or closed state of an electric line of a railway vehicle may be advantageously used in place of the relay 115, as it allows the use of a series of electronic pressure switches where a conventional relay would not have been able to operate, due to the minimum voltage requirements needed to power the coil 114 in order to move the contacts 116.

A further advantage of the use of an electronic circuit equivalent to the monitoring device 308 of the open or closed state of an electric line of a railway vehicle in place of a relay in a circuit as represented in FIG. 1, FIG. 4 and FIG. 5 is illustrated by the fact that, while the power dissipated by the coil 114 increases with the quadratic law

9

($\Delta V^2$*R) as the voltage Vbat varies in the range of −30% to +25%, the power dissipated by the device 308 increases with the linear law ($\Delta V$*Igen). A relay for railway applications such as the one illustrated in FIG. 1 normally has a minimum dissipated power of at least 5 W nominal @ 110 V DC corresponding to a nominal current of approximately 45 mA@110 V DC. In the presence of a Vbat=(110 V DC+25%) or Vbat=137.5 V DC, said relay dissipates 7.8 W.

Advantageously, the monitoring device 308 of the open or closed state of an electric line of a railway vehicle may be designed for a nominal reference current Igen equal to 10 mA, equivalent to the minimum recommended current value, as known to those skilled in the art in the electrical engineering sector, for cleaning the contacts of the pressure switches present in the circuits of FIG. 1 and FIG. 4.

In the presence of Vbat=110 V DC, the monitoring device 308 of the open or closed state of an electric line of a railway vehicle dissipates a power of just over 1 W, and in the presence of Vbat=137.5 V DC the device 308 dissipates an equal power at 1.37 W, both values being much lower than that dissipated by the relay 115 under equivalent conditions, and therefore producing a much lower amount of heat, so as to further increase the reliability and availability of the function.

Figure 6:
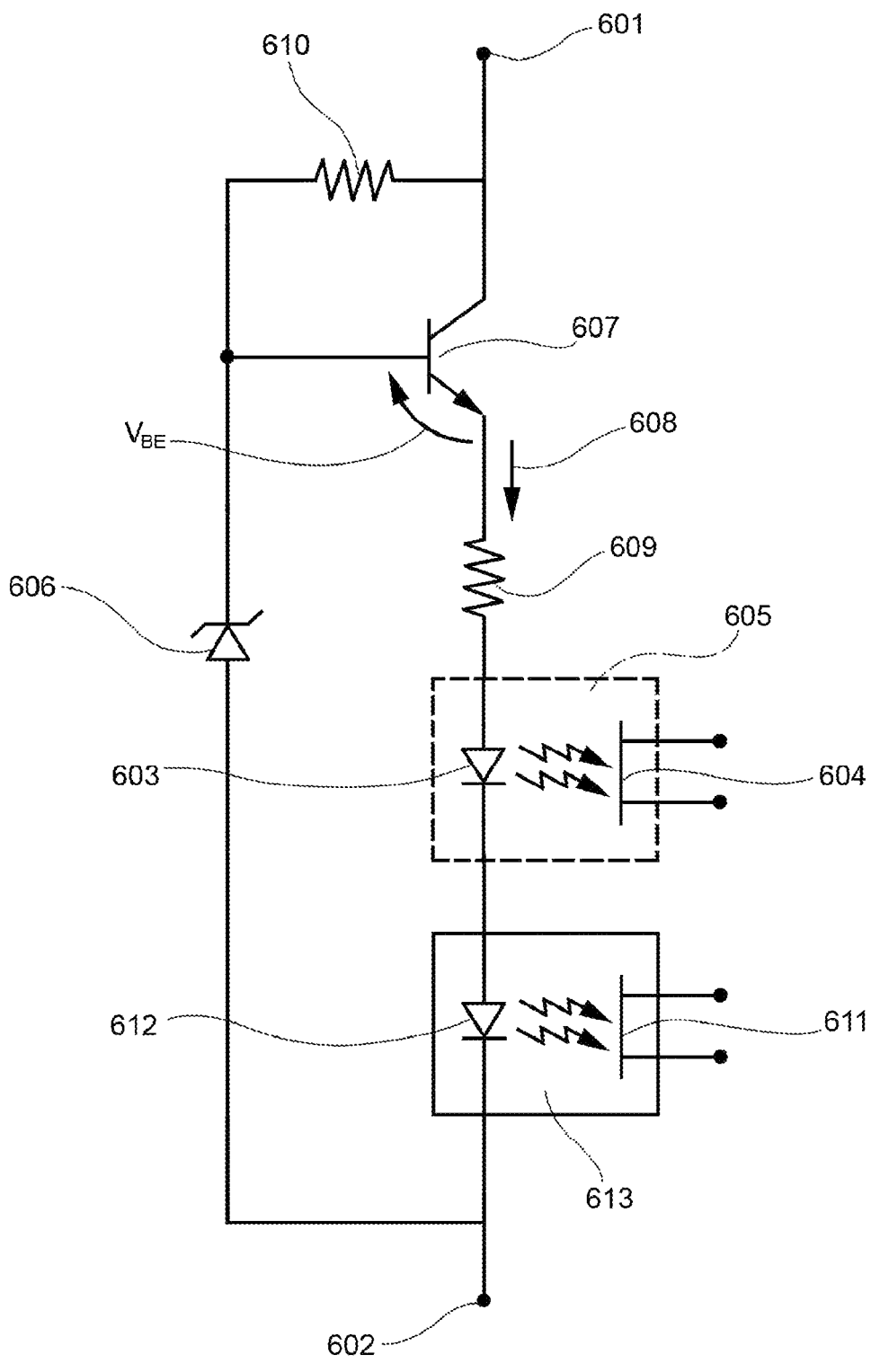
FIG. 6 illustrates a further embodiment of a monitoring device of the open or closed state of an electric line of a railway vehicle according to the invention.

For purely explanatory purposes and not claim purposes, FIG. 6 illustrates a possible, non-exclusive embodiment of the monitoring device 308 of the open or closed state of an electric line of a railway vehicle, integrating the current generator 301 and the detection and power supply module 304 in a single, simple circuit.

When there is no voltage applied to the ends 601, 602, no current flows within the lighting device, i.e., the LED 603, and therefore the photosensitive semiconductor 604 of the opto-isolator 605 is not excited.

When, at the ends 601, 602, a voltage is applied such as to polarize a zener diode 606, a transistor 607 will begin conducting, allowing the passage of a current 608 sized in such a way as to turn on the lighting device, i.e., the LED 603, which excites the photosensitive semiconductor 604 of the opto-isolator 605.

The current value 608 is sized by means of the polarization value of the zener diode 606, the resistance value of the resistor 609, the typical Vbe value of the transistor 608, and the voltage drop at the ends of the lighting device, i.e., the LED 603.

The activation value Vmin of the circuit may be sized by means of the voltage value of the zener diode 606 and the value of the resistor 610.

Additional opto-isolators 611 may be placed in series with the opto-isolator 605, allowing the replication of a relay having multiple contacts. The appropriate choice of the opto-isolators 605, . . . 611 allows the respective equivalent contacts having an NAO (normally open) or NC (normally closed) condition to be configured.

This invention further relates to an electric line for a railway vehicle which comprises at least one electric line disconnecting means 120, 121, 122, 501, 502, 503 arranged to open or close the electric line according to an upstream pressure value of a brake cylinder of the railway vehicle, and a monitoring device of the open or closed state of an electric line of a railway vehicle according to any of the embodiments described above.

The electric line is connected on a first side to a terminal 317 of a battery of the railway vehicle and on a second side to a reference potential. Also in this case the reference potential may be the ground.

The at least one electric line disconnecting means 120, 121, 122 may be an electrical contact, as shown in FIG. 4.

The at least one electric line disconnecting means 501, 502, . . . 503 may also be a semiconductor switching circuit, as illustrated in FIG. 5.

Furthermore, the electric line disconnecting means may be at least two, and at least one thereof may be an electrical contact and at least one thereof may be a semiconductor switching circuit.

The electric line disconnecting means 120, 121, 122, 501, 502, 503 may be arranged to open the electric line when the pressure value upstream of the brake cylinder of the railway vehicle exceeds a certain threshold pressure.

As mentioned above, the electric line disconnecting means 120, 121, 122, 501, 502, 503 may be at least two. In particular, a first electric line disconnecting means 120, 121, 122, 501, 502, 503 may be arranged to open or close the electric line according to a first pressure value upstream of a first brake cylinder of the railway vehicle, and a second electric line disconnecting means 120, 121, 122, 501, 502, 503 may be arranged to open or close the electric line according to a second pressure value upstream of a second brake cylinder of the railway vehicle.

Various aspects and embodiments of a monitoring device of the open or closed state of an electric line of a railway vehicle and of an electric line of a railway vehicle according to the invention have been described. It is understood that each embodiment may be combined with any other embodiment. Furthermore, the invention is not limited to the described embodiments, but may be varied within the scope defined by the appended claims.

The invention claimed is:

1. A monitoring device of the open or closed state of an electric line of a railway vehicle, wherein the electric line is connected at a first side to a terminal of a battery of the railway vehicle and at a second side to a reference potential, said electric line comprising a first electrical contact or a first semiconductor switching circuit arranged to open or close the electric line;

said monitoring device of the open or closed state of an electric line of a railway vehicle comprising:

a first connection terminal arranged to be connected to a first point of said electric line and a second terminal arranged to be connected to a second point of said electric line;

a current generator arranged for:

when there is a voltage greater than a minimum preset voltage Vmin at ends of said current generator, supplying a reference current having a non-zero predetermined value in said electric line; and when there is a voltage lower than the minimum preset voltage Vmin at the ends of said current generator, supplying a zero current in said electric line;

at least one opto-isolator means including a lighting device and a photosensitive semi-conductive element; and a current detection and power supply module arranged for:

detecting the current flowing in said current detection and power supply module;

when the detected current flowing in said current detection and power supply module has a value equal to or greater than the value of the reference current generated by said current generator, supplying a supply current to said lighting device, the supply current being arranged to switch on the at least one lighting device;

when the detected current flowing in said current detection and power supply module has a lower value than the value of the reference current generated by said current generator, supplying a substantially zero supply current to said lighting device, so as to switch off the at least one lighting device;

said at least one photo-sensitive semiconductor element assuming a first state at its output terminals, when the lighting device is switched off and does not illuminate said at least one photosensitive semiconductor element, and assuming a second state at its output terminals, when the lighting device is switched on and illuminates said at least one photosensitive semiconductor element;

the first state of said photosensitive semiconductor element being indicative of the fact that the electric line of the railway vehicle is in an open state.

2. The monitoring device of the open or closed state of an electric line of a railway vehicle of claim 1, wherein the lighting device of the at least one opto-isolator means is an LED.

3. The monitoring device of the open or closed state of an electric line of a railway vehicle of claim 2, wherein the first state of the photosensitive semiconductor element is a closed-circuit state and the second state of the photosensitive semiconductor element is an open-circuit state.

4. The monitoring device of the open or closed state of an electric line of a railway vehicle of claim 2, comprising a plurality of opto-isolator means, each of which comprises a respective lighting device and a respective photosensitive semi-conductor element.

5. The monitoring device of the open or closed state of an electric line of a railway vehicle of claim 4, wherein the first state of the photosensitive semiconductor element is a closed-circuit state and the second state of the photosensitive semiconductor element is an open-circuit state.

6. The monitoring device of the open or closed state of an electric line of a railway vehicle of claim 4, wherein the first state of the photosensitive semiconductor element is an open-circuit state and the second state of the element photosensitive semiconductor is a closed-circuit state.

7. The monitoring device of the open or closed state of an electric line of a railway vehicle of claim 2, wherein the first state of the photosensitive semiconductor element is an open-circuit state and the second state of the element photosensitive semiconductor is a closed-circuit state.

8. The monitoring device of the open or closed state of an electric line of a railway vehicle of claim 1, including a plurality of opto-isolator means, each of which include a respective lighting device and a respective photosensitive semi-conductor element.

9. The monitoring device of the open or closed state of an electric line of a railway vehicle of claim 8, wherein the first state of the photosensitive semiconductor element is an open-circuit state and the second state of the element photosensitive semiconductor is a closed-circuit state.

10. The monitoring device of the open or closed state of an electric line of a railway vehicle of claim 8, wherein the first state of the photosensitive semiconductor element is a closed-circuit state and the second state of the photosensitive semiconductor element is an open-circuit state.

11. The monitoring device of the open or closed state of an electric line of a railway vehicle of claim 1, wherein the first state of the photosensitive semiconductor element is an open-circuit state and the second state of the element photosensitive semiconductor is a closed-circuit state.

12. The monitoring device of the open or closed state of an electric line of a railway vehicle of claim 1, wherein the first state of the photosensitive semiconductor element is a closed-circuit state and the second state of the photosensitive semiconductor element is an open-circuit state.

13. An electric line for a railway vehicle, wherein the electric line comprises:

a first electrical contact or a first semiconductor switching circuit arranged to open or close the electric line according to a pressure value upstream of a brake cylinder of the railway vehicle;

a monitoring device of the open or closed state of the electric line of the railway vehicle comprising:

a first connection terminal arranged to be connected to a first point of said electric line and a second terminal arranged to be connected to a second point of said electric line;

a current generator arranged for:

when there is a voltage greater than a minimum preset voltage Vmin at ends of said current generator, supplying a reference current having a non-zero predetermined value in said electric line; and when there is a voltage lower than the minimum preset voltage Vmin at the ends of said current generator, supplying a zero current in said electric line;

at least one opto-isolator means including a lighting device and a photosensitive semi-conductive element; and a current detection and power supply module arranged for:

detecting the current flowing in said current detection and power supply module;

when the detected current flowing in said current detection and power supply module has a value equal to or greater than the value of the reference current generated by said current generator, supplying a supply current to said lighting device, the supply current being arranged to switch on the at least one lighting device;

when the detected current flowing in said current detection and power supply module has a lower value than the value of the reference current generated by said current generator, supplying a substantially zero supply current to said lighting device, so as to switch off the at least one lighting device;

said at least one photo-sensitive semiconductor element assuming a first state at its output terminals, when the lighting device is switched off and does not illuminate said at least one photosensitive semiconductor element, and assuming a second state at its output terminals, when the lighting device is switched on and illuminates said at least one photosensitive semiconductor element;

the first state of said photosensitive semiconductor element being indicative of the fact that the electric line of the railway vehicle is in an open state;

the electric line being connected on a first side to a terminal of a battery of the railway vehicle and on a second side to a reference potential.

14. The electric line for a railway vehicle of claim 13, comprising a first electrical contact and a first semiconductor switching circuit.

15. The electric line for a railway vehicle of claim 14, wherein the first electrical contact or the first semiconductor switching circuit is arranged to open the electric line when the pressure value upstream of the brake cylinder of the railway vehicle exceeds a certain threshold pressure.

16. The electric line for a railway vehicle according to claim 15, wherein the first electrical contact or the first semiconductor switching circuit is arranged to open or close the electric line according to a first pressure value upstream of a first brake cylinder of the railway vehicle; and a second electrical contact or a second semiconductor switching circuit is arranged to open or close the electric line according to a second pressure value upstream of a second brake cylinder of the railway vehicle.

17. The electric line for a railway vehicle according to claim 14, wherein the first electrical contact or the first semiconductor switching circuit is arranged to open or close the electric line according to a first pressure value upstream of a first brake cylinder of the railway vehicle; and a second electrical contact or a second semiconductor switching circuit is arranged to open or close the electric line according to a second pressure value upstream of a second brake cylinder of the railway vehicle.

18. The electric line for a railway vehicle of claim 13, wherein the first electrical contact or the first semiconductor switching circuit is arranged to open the electric line when the pressure value upstream of the brake cylinder of the railway vehicle exceeds a certain threshold pressure.

19. The electric line for a railway vehicle according to claim 18, wherein the first electrical contact or the first semiconductor switching circuit is arranged to open or close the electric line according to a first pressure value upstream of a first brake cylinder of the railway vehicle; and a second electrical contact or a second semiconductor switching circuit is arranged to open or close the electric line according to a second pressure value upstream of a second brake cylinder of the railway vehicle.

20. The electric line for a railway vehicle of claim 13, wherein the first electrical contact or the first semiconductor switching circuit is arranged to open or close the electric line according to a first pressure value upstream of a first brake cylinder of the railway vehicle; and a second electrical contact or a second semiconductor switching circuit is arranged to open or close the electric line according to a second pressure value upstream of a second brake cylinder of the railway vehicle.

* * * * *